(No Model.)

H. S. BLACKMORE.
PROCESS OF AND APPARATUS FOR DISSOCIATING SALTS OF ALKALIES BY ELECTROLYSIS.

No. 508,804. Patented Nov. 14, 1893.

WITNESSES:
Edward Wolff
William J. Miller

INVENTOR:
Henry S. Blackmore.
BY
Van Santvoord & Hauff
ATTORNEYS.

UNITED STATES PATENT OFFICE.

HENRY S. BLACKMORE, OF MOUNT VERNON, NEW YORK.

PROCESS OF AND APPARATUS FOR DISSOCIATING SALTS OF ALKALIES BY ELECTROLYSIS.

SPECIFICATION forming part of Letters Patent No. 508,804, dated November 14, 1893.

Application filed September 8, 1892. Serial No. 445,346. (No model.)

*To all whom it may concern:*

Be it known that I, HENRY S. BLACKMORE, a citizen of the United States, residing at Mount Vernon, in the county of Westchester and State of New York, have invented new and useful Improvements in Processes of and Apparatus for Dissociating Salts of Alkalies by Electrolysis, of which the following is a specification.

The object of my invention is to separate the acid and alkaline constituents which compose the alkali salts by means of what is called secondary electrolysis in such a manner that the products of dissociation or ions will not be contaminated with the alkali salt (electrolyte) operated upon and so that the ions may be drawn from the apparatus without stopping the operation.

My invention is based upon a principle which for a number of years has been illustrated by an experiment relative to the separation of the acid from the base of a salt while in solution by means of electrolysis which is effected by filling three vessels with water, placing them side by side, dissolving in the middle vessel a salt such as sodic sulphate, bringing the liquid contained in the middle vessel in communication with the liquid in the outer vessel by means of cotton wicks or siphons, introducing into the outer vessels the opposite electrodes of an electric battery and tinging the liquids contained in the outer vessels with a solution of some vegetable coloring matter such as litmus, the object being to illustrate the passage of alkali and acid into the opposite outer vessels, when a current of electricity is passed through, the blue coloring becoming red in presence of an acid and green in presence of an alkali. Now I have discovered that by providing a uniform supply of salt in the middle vessel, maintaining the liquid contents of the three vessels at a constant and uniform level and drawing off the products of dissociation (ions) from their solution in the outer vessels, the process of dissociation can be carried on without interruption and the ions conveyed into the outer vessels are not contaminated with the alkali salt (electrolyte) operated upon.

The apparatus which I have constructed for the purpose of carrying out the process above stated, is illustrated in the accompanying drawings in which—

Figure 1:
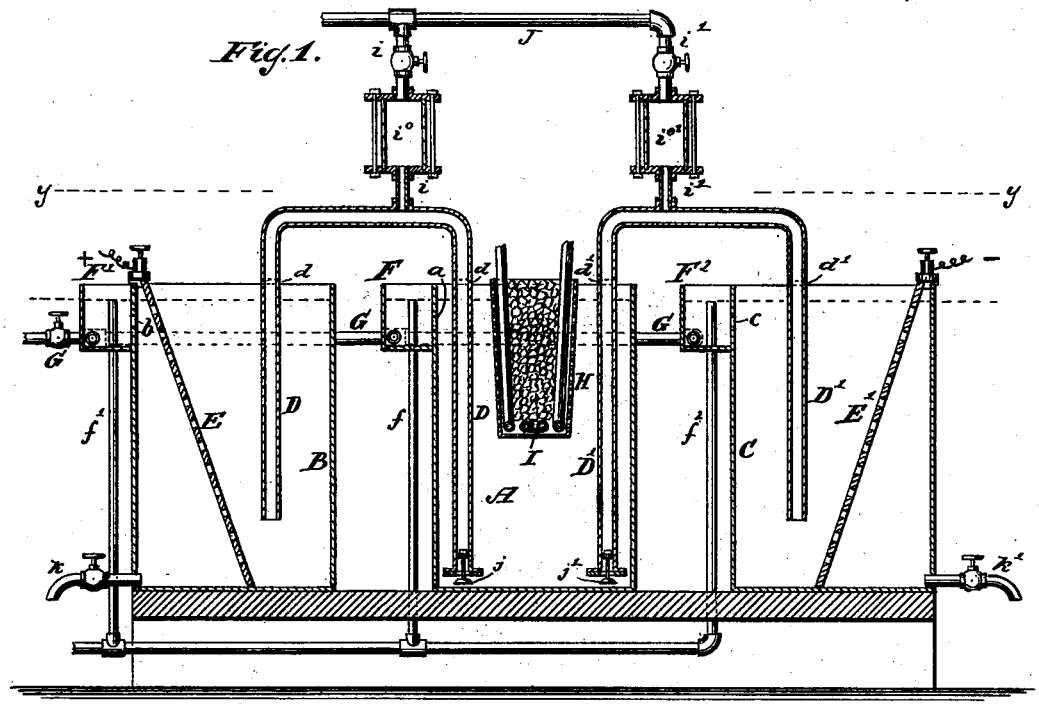
Figure 2:
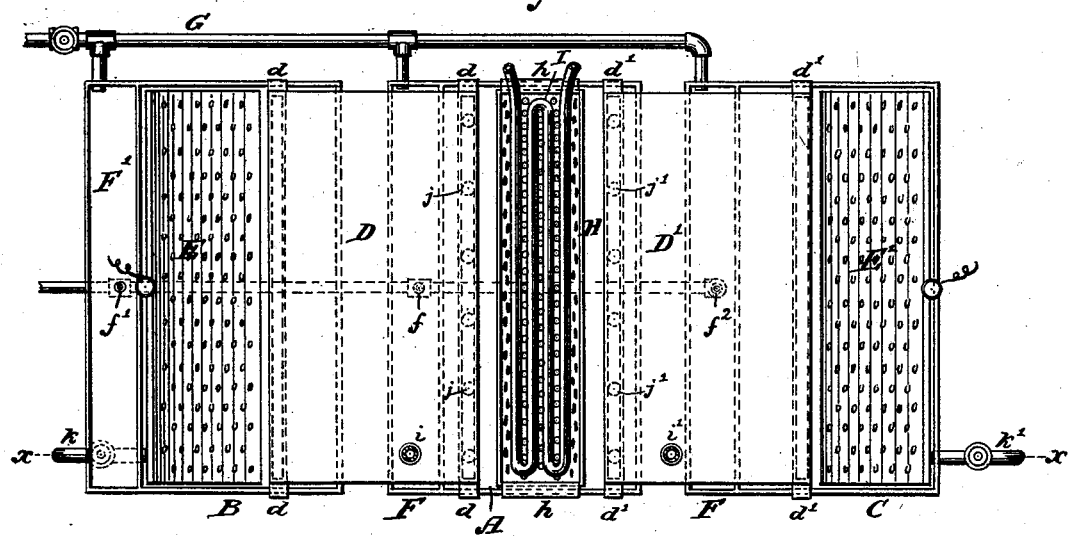

Figure 1, represents a longitudinal vertical section in the plane $x\ x$ Fig. 2. Fig. 2 is a horizontal section in the plane $y\ y$ Fig. 1.

In the drawings the letter A designates the supply tank and the letters B C designate the receiving tanks which contain the opposite electrodes E E' of an electric battery and which communicate with the supply tank A by means of siphons D D'. These siphons are supported by flanges $d\ d'$ which bear upon the edges of the tanks, as shown in Fig. 2. Each of the tanks is provided with a trough F, F', F², respectively and all these troughs communicate with the respective tanks by means of openings $a\ b\ c$ and they also communicate with a common water supply pipe G. Each of the troughs is provided with an overflow pipe $f\ f'\ f^2$, respectively, which rise in said troughs to a common level indicated by dotted lines in Fig. 1, so that when the water supply pipe G is kept open, the tanks A B C will be filled to a level with the mouths of the overflow pipes $f,\ f',\ f^2$, and a uniform and constant level can be maintained in said tanks. Into the supply tank A is placed a perforated grid or cage H which is supported by flanges $h\ h$ bearing upon the edges of the tank as shown in Fig. 2 and in the interior of this cage or near its bottom is situated a coil I which communicates with a steam supply pipe (not shown in the drawings). The siphons D D' connect by pipes $i\ i'$ with a pipe J which communicates with an exhaust pump (not shown in the drawings). The pipes $i\ i'$ contain transparent portions $i°\ i°'$, through which the level of the liquid in said pipes can be observed.

The tanks A, B, C, are filled with liquid to a common level, which is indicated by dotted lines in Fig. 1 and this level is constantly maintained by means of the overflow pipes $f\ f'\ f^2$ and the water supply pipe G and the salt to be dissociated such, for instance, as common salt (sodic chloride) is placed in a solid state into the cage H and the siphons D D' are filled with liquid from the tanks B C by creating a partial vacuum in the exhaust pipe J, said siphons being provided with valves $j\ j'$ at the bottom ends of their shanks which extend down into the tank A, so that as soon as the suction commences, said valves will close and no liquid from the tank A will enter the siphons. After the siphons have been filled with liquid and as soon as the liquid in the tank A is properly saturated with sodic chloride, an electric current is turned on through the electrodes, whereby the sodium chloride held in solution in the tank A becomes dissociated, the anion being caused by the action of the electric current to pass through the siphon D into the tank B which contains the anode E while the cation passes through the siphon D' into the tank C which contains the cathode E', said siphons forming the communication between the liquid contents of the tank A with those of the tanks B C respectively. The anion (Cl) on reaching the tank B combines with hydrogen under proper conditions and forms HCl setting free oxygen and the cation (Na) on reaching the tank C combines with oxygen forming $Na_2O$, setting free hydrogen, so that the solution in the tank B shows an acid re-action and the solution in the tank C an alkaline re-action, while the solution in the tank A is neutral. When the liquids in the tanks B C have become properly saturated with acid or alkali, they are drawn off through the faucets $k$ $k'$ which are close to the bottoms of the tanks where the most concentrated solution is situated. At the same time the water supply pipe G is kept open, so that a sufficient supply of fresh water is introduced into each tank to maintain the level indicated by the dotted lines in Fig. 1, it being obvious, that if the level of the liquids in the tanks B C should be permitted to sink beneath the level of the liquid in the tank A, a portion of the liquid from the latter tank would pass through the siphons D D' into the tanks B C and the solutions of the ions would be contaminated with the electrolyte. By means of the heating coil I in the lower part of the perforated cage H the solution of the salt contained in said cage is facilitated. From this description it will be understood, that I am enabled to keep up an uninterrupted supply of salt in the tank A, while the ions collect in the tanks B C, whence they can be drawn off by means of the faucets $k$ $k'$ so that the process of dissociation can be carried on without interruption. Furthermore by maintaining a uniform and constant level of liquid in the several tanks the danger that a portion of the electrolyte from the tank A might find its way into the tanks B C before having become dissociated, is avoided, it being self-evident that, if the level of the liquid in the tanks B C should be permitted to sink below the level of the liquid in the tank A, a portion of the solution contained in the tank A would pass through the siphons D D' into the tanks B C and the ions contained in these tanks would be contaminated with the electrolyte. In my process the anion is caused to flow through the siphon D into the tank B and the cation through the siphon D' into the tank C simply and solely by the electrical action and the ions are not liable to be contaminated with the electrolyte.

It must be remarked that the tanks B C may be insulated and constructed of such materials, that they will take the place of the electrodes and in that case the electrodes E E' can be dispensed with, the battery being connected directly to the tanks.

What I claim as new, and desire to secure by Letters Patent, is—

1. The within described process of dissociating salts of the alkalies by electrolysis which consists in providing a bath of the electrolyte, two independent bodies of liquid, and two bodies of liquid for establishing an unobstructed communication between said bath and the independent bodies of liquid, maintaining automatically a uniform and constant level of the bath and the independent bodies of liquid, passing a current of electricity through the bath and the independent bodies of liquid and withdrawing portions of the independent bodies of liquid while the electric current is maintained.

2. The within described process of dissociating salts of the alkalies by electrolysis which consists in providing a bath of the electrolyte, two independent bodies of liquid, and two bodies of liquid for establishing an unobstructed communication between said bath and the independent bodies of liquid, keeping up in the bath a continuous supply of the salt to be dissociated, maintaining automatically a uniform and constant level of the bath and the independent bodies of liquid, passing a current of electricity through the bath and the independent bodies of liquid and withdrawing portions of the independent bodies of liquid while the electric current is maintained.

3. The within described process of dissociating salts of the alkalies by electrolysis which consists in providing a bath of the electrolyte, two independent bodies of liquid, and two bodies of liquid for establishing an unobstructed communication between said bath and the independent bodies of liquid, maintaining automatically a uniform and constant level of the bath and the independent bodies of liquid, passing a current of electricity through the bath and the independent bodies of liquid and withdrawing portions of the independent bodies of liquid from their lowest and most concentrated parts while the electric current is maintained.

4. An apparatus for dissociating salts of the alkalies by electrolysis which consists of three tanks A B C, a cage H suspended in the tank A, a siphon D communicating with the tanks A and B, a siphon D' communicating with the tanks A and C and electrodes in the tanks B and C, substantially as described.

5. An apparatus for dissociating salts of the alkalies by electrolysis which consists of three tanks A B C, troughs F F' F² which communicate with the tanks A B C, respectively, a water supply pipe connected to the several troughs, overflow pipes $f\ f'\ f^2$, one for each trough, a siphon D communicating with the tanks A B, a siphon D' communicating with the tanks A C and electrodes in the tanks B C, substantially as described.

6. An apparatus for dissociating salts of the alkalies by electrolysis which consists of three tanks A B C, a cage H suspended in the tank A, a siphon D communicating with the tanks A B, a siphon D' communicating with the tanks A C, valves $j\ j'$ in the siphons D D', an exhaust pipe J connected to the siphons, a supply pipe G connected to the tanks A B C and electrodes in the tanks B C, substantially as described.

In testimony whereof I have hereunto set my hand in the presence of two subscribing witnesses.

HENRY S. BLACKMORE.

Witnesses:
WM. C. HAUFF,
W. HAUFF.